United States Patent
Schulz et al.

(10) Patent No.: US 11,339,912 B2
(45) Date of Patent: May 24, 2022

(54) COUPLING FOR FLUID-CONDUCTING LINES

(71) Applicant: NEXANS, Courbevoie (FR)

(72) Inventors: Holger Schulz, Hannover (DE); Christian Reiter, Sarstedt (DE)

(73) Assignee: NEXANS, Courbevoie (FR)

( * ) Notice: Subject to any disclaimer, the term of this patent is extended or adjusted under 35 U.S.C. 154(b) by 178 days.

(21) Appl. No.: 16/713,395

(22) Filed: Dec. 13, 2019

(65) Prior Publication Data

US 2020/0224817 A1 Jul. 16, 2020

(30) Foreign Application Priority Data

Dec. 18, 2018 (EP) ..................................... 18306728

(51) Int. Cl.
| | | |
|---|---|---|
| *F16L 59/065* | (2006.01) | |
| *F16L 59/18* | (2006.01) | |
| *F16L 59/14* | (2006.01) | |

(52) U.S. Cl.
CPC ........... *F16L 59/187* (2013.01); *F16L 59/065* (2013.01); *F16L 59/141* (2013.01); *F16L 59/185* (2013.01)

(58) Field of Classification Search
CPC ..... F16L 59/065; F16L 59/187; F16L 59/141; F16L 59/185; F16L 59/184; F16L 59/075; F16L 59/10; F16L 59/07; F16L 55/1015
See application file for complete search history.

(56) References Cited

U.S. PATENT DOCUMENTS

| | | | |
|---|---|---|---|
| 4,515,397 A | 5/1985 | Nowobilski et al. | |
| 5,941,287 A | 8/1999 | Terito, Jr. et al. | |
| 6,257,282 B1 | 7/2001 | Emmer et al. | |
| 2009/0123221 A1* | 5/2009 | Marshall | F16L 59/18 |
| | | | 403/24 |
| 2015/0362110 A1 | 12/2015 | Von Keitz | |

FOREIGN PATENT DOCUMENTS

| | | | | |
|---|---|---|---|---|
| DE | 363986 C | * | 11/1922 | ............ F16L 59/184 |
| DE | 102017005588 A1 | * | 12/2018 | ............ F16L 29/04 |
| EP | 2781818 | | 9/2014 | |
| FR | 2362330 A1 | * | 3/1978 | ............ F16L 59/184 |
| GB | 2296749 | | 7/1996 | |
| JP | 2018128120 A | * | 8/2018 | ............ F16L 37/30 |
| WO | WO-8403929 A1 | * | 10/1984 | ............ F16L 59/185 |
| WO | 2011061704 | | 5/2011 | |

OTHER PUBLICATIONS

International Search Report dated Jun. 29, 2019.

* cited by examiner

*Primary Examiner* — Matthew Troutman
*Assistant Examiner* — James A Linford
(74) *Attorney, Agent, or Firm* — Sofer & Haroun, LLP

(57) ABSTRACT

A coupling arrangement (100) for connecting thermally insulated, fluid-conducting lines (102, 104) has a coupling (101) comprising a first coupling part (106) and a second coupling part (108), and connecting means (110) for connecting the two coupling parts (106, 108). A covering (112) surrounding the coupling (101) is provided, which covering, on both sides of the coupling (101), in each case lies against the thermal insulation of the fluid-conducting lines (102, 104). A cavity (114) formed by the covering (112) is configured for thermal insulation between the coupling (101) and the exterior of the covering (112).

11 Claims, 1 Drawing Sheet

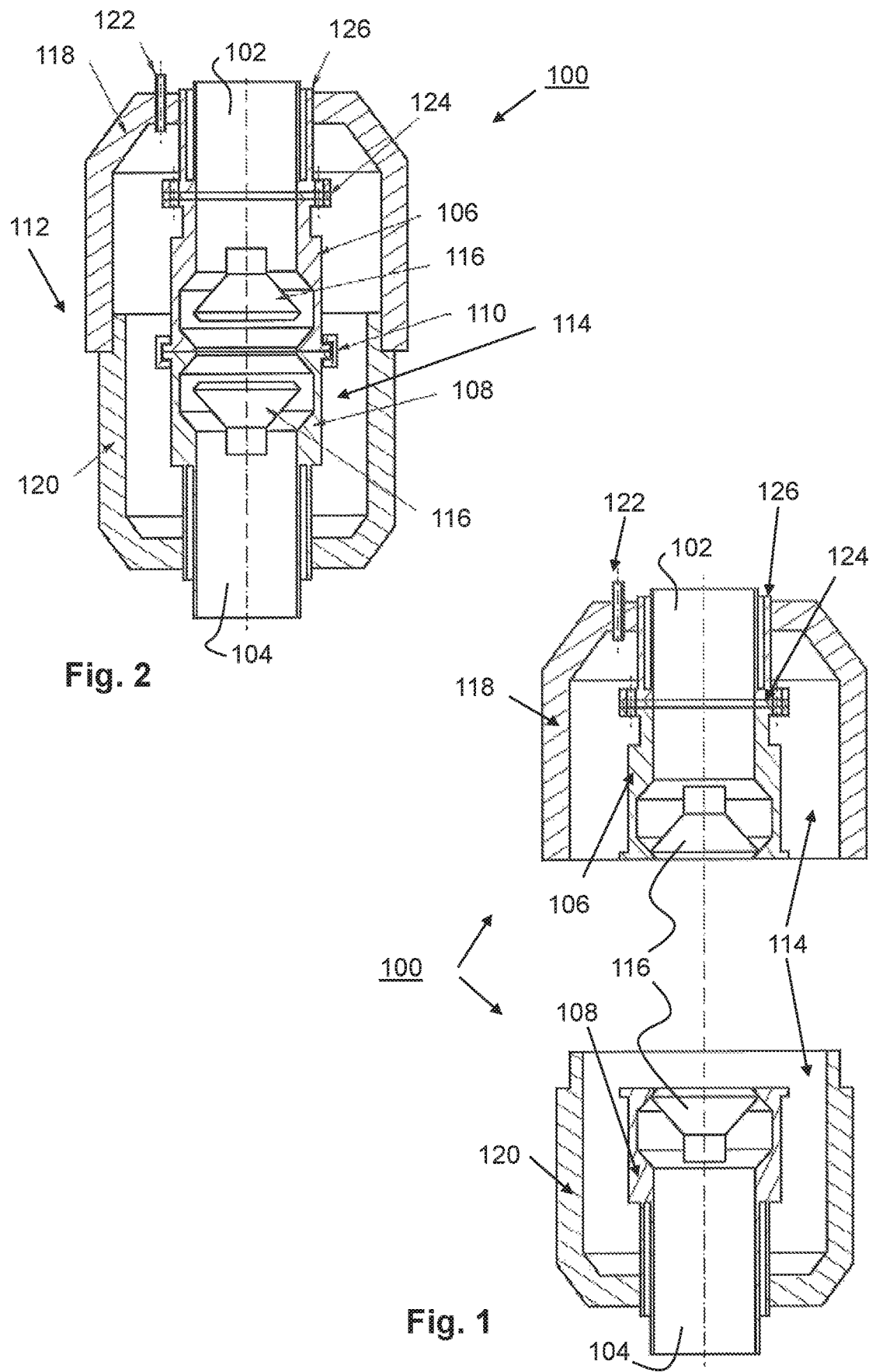

COUPLING FOR FLUID-CONDUCTING LINES

RELATED APPLICATION

This application claims the benefit of priority from European Patent Application No. 18 306 728.9, filed on Dec. 18, 2018, the entirety of which is incorporated by reference.

FIELD

The invention relates to couplings for connecting fluid-conducting lines, in particular lines for cryogenic fluids.

BACKGROUND

The loading of cryogenic media, for example liquified gases, on tankers or ships frequently takes place with lines which are only partially heat-insulated, if at all, and in particular with couplings which are not heat-insulated. In regions without heat insulation, the temperature of the external surface of the non-insulated lines and couplings is very greatly reduced, and therefore the lines and couplings ice up in these regions during the loading. During the loading of very cold liquids, for example liquid hydrogen with a temperature of −253° C. or liquid helium with a temperature of −269° C., oxygen from the atmosphere can condense on the surface of non-insulated lines and couplings, the oxygen becoming liquid at −183°. Liquid oxygen considerably increases the risk of fire, which is very clearly undesirable.

The use of rigid or flexible heat-insulated lines with insulation which consistently keeps the temperature at the surface of the lines and couplings above the boiling point of oxygen can avoid this problem at least at the lines themselves. Suitable heat insulation can be achieved, for example, by means of vacuum-insulated lines.

Some components of lines for cryogenic fluids can be insulated, in particular vacuum-insulated, only with great effort, if at all. These include couplings which connect line sections fixedly or releasably to one another, and couplings for connection to the transport container to be filled or to be emptied. In addition to the abovementioned couplings, lines of loading devices for cryogenic media generally have to be provided with an emergency separating coupling which, when an axial tensile force acting on the coupling parts or the lines connected thereto is exceeded or when a bending torque acting on the coupling parts or the lines connected thereto is exceeded, separates the coupling parts and therefore the line sections from one another and thereby prevents or limits damage to the lines or to the loading device. The emergency separating couplings and the couplings which are releasable without a tool frequently have highly complex and bulky triggering mechanisms which can be thermally insulated only with difficulty.

There are couplings for thermally insulated, fluid-conducting lines which themselves provide insulation, for example "Johnston couplings". However, the coupling halves in said known couplings have to intermesh over relatively long distances, which has an unfavourable effect in particular on a rapid separation of the line parts from one another, and therefore this type of coupling is not suitable as an emergency separating coupling.

In addition, line segments between the components involved in the loading, i.e. the tank from which the cryogenic medium is removed, and the tank into which the cryogenic medium is loaded, frequently have to be electrically insulated from one another. The intention by this means is, inter alia, to prevent electrical potential differences in the connection of the line for the loading or in the separation after loading has taken place from forming sparks which may set combustible fluids emerging at the coupling, or other combustible gases, on fire. In particular in the production of vacuum-insulated lines, use is frequently made of stainless steel or other electrically conductive metals, and therefore, specifically in these cases, corresponding measures are required for the electrical insulation of line sections.

For the electrical insulation of vacuum-insulated line sections, rings of electrically non-conductive material have to be arranged in each case between the inner pipes and the outer pipes of the line sections, the rings having to be connected in a permanently gas-tight manner to the respective pipe ends in order to maintain the vacuum. In a realistic view, this type of electrical insulation of line sections is not possible.

Taking this as the starting point, the present invention has the object of providing a coupling arrangement for fluid-conducting lines, which overcomes one or more of the problems mentioned at the beginning or at least improves known coupling arrangements.

SUMMARY OF THE INVENTION

To achieve this object, the invention, according to a first aspect, proposes a coupling arrangement for connecting thermally insulated, fluid-conducting lines, which coupling arrangement has a coupling with a first coupling part and a second coupling part, and also connecting means in order to couple the two coupling parts to each other. The connecting means can be configured here for permanently or releasably connecting the coupling parts, for example by means of screws or tension rings or clamping rings or clamping tongs. Connecting means for the repeatedly releasable connection of lines without a tool can be used in particular for temporary connections of lines, for example for connection only during loading of fluids. Without a tool in this context means that the connecting means permit the coupling parts to be released from one another without a special tool, for example by means of locking levers or locking clamps which are permanently connected to a coupling part. Alternatively or additionally to the separation after actuation of a locking device provided for this purpose, the connecting means can be configured to permit a separation of the coupling parts from one another when a predetermined tensile force acting axially on the coupling or the coupling arrangement, or a bending torque acting on the coupling or the coupling arrangement, is exceeded.

In addition, the coupling arrangement comprises a covering which surrounds the connected coupling parts, in particular the non-insulated coupling parts and, on both sides of the coupling, lies in each case against the thermal insulation of the fluid-conducting lines. The thermal insulation of the fluid-conducting lines can comprise, for example, vacuum insulation with an inner pipe and an outer pipe, the intermediate space of which is evacuated or at least has a substantially lower internal pressure than an ambient pressure. The pipes can be composed of steel, for example stainless steel, or other suitable metals or alloys or of plastics having sufficient mechanical and thermal strength. Other insulations comprise coverings of the actual fluid-conducting line with suitable thermal insulators. The covering surrounding the coupling parts can itself provide thermal insulation. For this purpose, the covering can be composed of thermally insulating material, or a cavity located between an inner and an outer surface of the covering can be filled with a thermally insulating material. A suitable filling can comprise, for example, hollow glass microballs, "glass bubbles", which touch only at small surfaces and thus reduce the transport of heat by heat conduction. In addition, the solid materials obstruct the transport of heat by convection. The covering configured for thermal insulation can be configured, inter alia, to ensure that the temperature on the external surface of the covering lies above the condensation temperature of oxygen.

The coupling can furthermore have sealing means for sealing the two coupling parts when they are coupled to each other. Sealing means can comprise sealing rings or sealing discs arranged between the coupling parts, but it is also possible to provide the sealing means structurally as an integral part of the coupling parts, for example by a particular surface design and/or surface machining.

In principle, it is desirable in each type of coupling of fluid-conducting lines, to prevent, or at least to limit as far as possible, the escape of the fluid during a connection or separation. For this purpose, use is generally made of self-sealing couplings, for example dry couplings, i.e. couplings, the coupling parts of which seal the lines when the coupling is separated. The coupling parts are connectable, for example latchable, to one another in a releasable and liquid-tight manner. A sealing arrangement, for example a spring-loaded valve with closing elements, is arranged in the throughflow channel in each coupling part. The closing elements keep the valves open when the coupling is coupled together. When the coupling parts are separated, the valves seal the line which is connected to the respective coupling part.

Accordingly, one or both coupling parts can also each have a sealing arrangement which, when the coupling is separated, closes the line connected to the respective coupling part in a fluid-tight manner, and which, when the coupling parts are coupled, connects the respective fluid channels of the lines to one another in a fluid-conducting manner. The sealing arrangement can comprise, for example, a spring-loaded valve or valve actuated by other closing elements, for example a ball valve or conical valve, which closes the coupling part when the coupling parts are separated. Other embodiments of the sealing arrangement are also conceivable, for example locking slides or locking flaps or the like.

The covering can be of multi-part design. In this case, in the separated state of the coupling, one or more parts forming a first hood of the covering can be connected to the fluid-conducting line connected to the first coupling part. Accordingly, one or more parts forming a second hood of the covering are connected to the fluid-conducting line connected to the second coupling part, and therefore, when the coupling is separated, a hood is in each case connected to a coupling part.

In a covering of multi-part design, the first and the second hood of the covering can lie against the thermal insulation of the line, or can be connected thereto, in a gas-tight manner or in a way at least delaying an escape or admission of gas. A gas-tight connection can be produced, for example, via corresponding sealing means between a hood and the line, or via an integrally bonded connection of hood and thermal insulation of the line. Depending on the design, the connection can at least delay an escape or admission of gas. The first and the second hood of the covering are connectable to each other in a releasable and gas-tight manner or in a manner at least delaying an escape or admission of gas, for example by means of sealing surfaces which lie against one another or intermesh and between which a seal is arranged. The hoods can themselves in each case likewise be of multi-part design. At least one of the hoods of the covering can be arranged in an axially displaceable manner on the fluid-conducting line. A multi-part design of the covering or of the hoods and axial displaceability of a hood can afford advantages for the installation.

The covering can have an inlet or outlet opening in order to configure the cavity to avoid the condensation of atmosphere which has penetrated into the cavity. In a multi-part covering, the inlet or outlet opening can be arranged on at least one of the hoods. The configuration of the cavity to avoid the condensation of atmosphere which has penetrated into the cavity can comprise introducing media which does not condense and is preferably non-combustible, at a temperature occurring on a surface in the interior of the covering during operation via the inlet opening. Examples of such media are non-combustible gases having a condensation temperature lying below the lowest condensation temperature, and in particular melting point, occurring at the surface of the components surrounded by the covering and/or at the inner surface of the covering. An example of a suitable gas is helium with a very low condensation temperature. The introduced medium or media display(s) at least part of the atmosphere within the covering and therefore reduce(s) the quantity of oxygen contained in the enclosed atmosphere and of other gases which could condense in the interior of the covering. A low positive pressure of the medium or of the media within the covering, which positive pressure can be monitored by means of a pressure sensor connected to the interior of the covering, can be set here. If the covering is not arranged in a gas-tight manner around the coupling, when a threshold value is fallen short of, new medium or gas can be introduced into the interior in order to restore the original positive pressure and to prevent the penetration of oxygen-containing ambient air. In addition, a, preferably automatically opening, pressure control valve can be provided as a safety valve which prevents the interior pressure from rising above a certain value.

As an alternative to the introduction of the medium or media, a lower pressure than the ambient pressure can be produced via the outlet opening in the covering, for example by a vacuum pump. For this purpose, the interior space of the covering can be fluidically connectable at least temporarily to a vacuum pump, for example via a venting valve. The vacuum pump can be activated as required and depending on the pressure by a pressure sensor which is fluidically connected to the interior of the covering, for example if the covering is not arranged in a completely gas-tight manner around the coupling, in order to restore the original negative pressure in the interior of the covering. In addition, a, preferably automatically opening, vacuum valve can be provided as a safety valve which prevents too low an internal pressure, which could lead to deformation of the covering. In this alternative, the covering is expediently provided with structural reinforcements, for example webs and/or rib structures, in order to provide the covering with sufficient dimensional stability and strength. If the covering is arranged around an emergency separating coupling which separates the lines from one another when permissible axial tensile forces or bending torques are exceeded, a ventilation valve can be provided which compensates for the negative pressure within the covering in order not to prevent or obstruct the emergency separation. The ventilation valve can be activated via a force transducer or displacement transducer connected to the lines and ventilates the evacuated cavity preferably in the event of a mechanical loading which is smaller than that at which the emergency separating coupling separates the lines from one another. In the case of a coupling which is regularly connected and separated, the ventilation valve can be connected to an actuating device for separating or connecting the coupling.

Embodiments of the coupling can have electrical insulating means between the coupling parts and the connecting means or between a coupling part and a fluid-conducting line connected thereto. For this purpose, in the last variant, electrical insulation can be arranged between at least one pipe end and the coupling part attached thereto, for example a ring or a disc made of electrically insulating material. If the pipe end and the coupling part and also the electrical insulation arranged in between are connected by means of screws or other connecting elements, said screws or connecting elements also have to be formed from an electrically non-conductive material or the electrical connection of pipe end and coupling part has to be interrupted by means of corresponding insulating sleeves, insulating sheathings around the connecting elements, or the like. In this variant, the covering can enclose the electrical insulating means. With electrical insulation between the two coupling parts, for example by means of an electrically non-conductive sealing ring between the coupling surfaces, the connecting means holding together the coupling parts likewise have to be of electrically non-conductive design.

In one or more of the above-described embodiments and variants, the covering can be composed of an electrically non-conductive material, for example an electrically non-conductive plastic, such as polyethylene (PE) or glass-fibre-reinforced plastic (GFRP). If the covering itself is composed of an electrically conductive material, an electrical insulator can be arranged between the covering and its connection to the thermal insulation of the fluid-conducting line. Alternatively or additionally, for example in the case of a multi-part covering with two hoods, electrical insulation can be arranged between the hoods.

In addition to the coupling, whatever the design, other parts of the line system that cannot be insulated in a simple manner, for example the arrangement for the electrical insulation of line segments, can therefore likewise be enclosed by the covering of the coupling. However, it is also possible to cover said parts in each case with a separate covering, as described above.

The electrical insulation between the coupling parts or the at least one pipe end and the coupling part attached thereto, and also the electrically insulating properties of the hoods or the fastening thereof to the line ensure the required electrical separation of the two line parts.

BRIEF DESCRIPTION OF THE DRAWING

The invention is explained in more detail below by way of example using an embodiment with reference to the accompanying figures. All of the figures are purely schematic and are not to scale. In the figures:

FIG. 1 shows a schematic sectional illustration of an exemplary coupling arrangement according to the invention in the separated state, and FIG. 2 shows a schematic sectional illustration of the exemplary coupling arrangement according to the invention in the coupled state.

Identical or similar elements are provided with identical or similar reference signs in the figures.

Exemplary Embodiment

FIG. 1 shows a schematic sectional illustration of an exemplary coupling arrangement 100 according to the invention in the separated state. The covering 112 of the coupling arrangement illustrated by way of example comprises a first hood 118 and a second hood 120. The hoods are composed, for example, of an electrically non-conductive material, such as, for example, PE or GFRP. The hoods do not lie directly against the surface of the coupling parts 108, 110, but rather form a cavity 114 which can be evacuated in order to avoid the condensation of atmosphere which has penetrated into the cavity, or can be filled with media which does not condense and is preferably non-combustible at a temperature prevailing at a surface in the interior of the covering during operation. The first and the second hood 118, 120 lie against the thermal insulation 126 of the fluid-conducting lines 102 and 104, preferably in a gas-tight manner. In this example, the thermal insulation 126 is an outer pipe of a vacuum-insulated fluid line. The first hood 118 is provided with an inlet or outlet opening 122 via which, when the coupling parts 106, 108 are coupled and hoods 118, 120 are connected to each other, the interior space 114 can be evacuated or filled with the non-condensing, preferably non-combustible media (not shown in the figure). The fluid-conducting line 104 is connected directly to the second coupling part 108. Electrical insulation 124 which is likewise arranged within the first hood 118 is provided between the fluid-conducting line 102 and the first coupling part. The electrical insulation can be an insulating disc or an insulating ring, which insulating disc or insulating ring is arranged between flanges of line 102 and coupling part 106. The flanges are connected in a fluid-tight manner to electrically insulating means. In the example illustrated in the figure, the coupling parts 106, 108 form an emergency separating coupling which separates the coupling when a tensile force or a bending torque on the lines 102, 104 is exceeded. Each of the coupling parts has a sealing arrangement 116 which seals the line ends which are separated from one another. In the figure, the sealing arrangement 116 comprises a conical valve which is pressed against a valve seat by a mechanism which is not illustrated in the figure. In order also to achieve high fire resistance or fire safety of the valves, the valves can have conical first sealing surfaces and the valve seats can have conical second sealing surfaces, wherein the opening angle of the first sealing surfaces is smaller than the opening angle of the second sealing surfaces. The high contact pressure resulting on the annular sealing surface because of the different cones brings about sealing of the valve arrangements, the sealing reliably functioning both under a high temperature loading, as occurs in the event of a fire, and also in the event of cryogenic media with correspondingly low temperatures of the valve arrangements. The tightness in particular for cryogenic media can furthermore be improved by sealing elements which are elastic at low temperature. A sealing element which is flexible at low temperature, not illustrated in the figure, can be provided on at least one of the sealing surfaces of a valve or of a corresponding valve seat. Examples of materials which are stable at low temperatures are polytetrafluoroethylene or fluoroelastomers.

FIG. 2 shows a schematic sectional illustration of the exemplary coupling arrangement according to the invention in the coupled state. The first and the second coupling part 106, 108 are connected in a sealing manner to connecting means 110. The sealing arrangements 116 of the two coupling parts 106, 108 are open and the lines 102, 104 are fluidically connected to each other. The connecting means 110 are illustrated in the figure by a closure clamp which, at a tensile loading exceeding a certain value or at a bending torque exceeding a certain value, opens up the connection of the coupling parts 106, 108 and separates the lines from each other. The first and the second hood 118, 120 are connected to each other and form the covering 112 with the cavity 114. Via the inlet/outlet opening 122, the cavity 114 which is now closed preferably in a gas-tight manner or at least delaying an escape or admission of gas can be filled with non-condensing, preferably non-combustible media, or evacuated (not illustrated in the figure). Sealing means, not shown in the figure, can be provided at the contact point between the first and second hood. The electrical insulation of the lines 102, 104 is ensured by the electrical insulation 124.

LIST OF REFERENCE SIGNS

100 Coupling arrangement
102 Line
104 Line
106 First coupling part
108 Second coupling part
110 Connecting means
112 Covering
114 Cavity
116 Sealing arrangement
118 First hood
120 Second hood
122 Inlet/outlet opening
124 Electrical insulation
126 Thermal insulation

The invention claimed is:

1. A coupling arrangement for connecting a first and a second thermally insulated, fluid-conducting line comprising:
a coupling having a first coupling part arranged at the first fluid-conducting line;
a second coupling part arranged at the second fluid-conducting line; and
connecting means for releasably connecting the two coupling parts, wherein a covering surrounding the coupling parts is provided, wherein a cavity formed by the covering is configured for avoiding the condensation of atmosphere which has penetrated into the cavity, wherein the covering comprises a first and a second hood, a first end of the first hood abutting the thermal insulation of first fluid-conducting line and a first end of the second hood abutting the thermal insulation of second fluid-conducting line, wherein respective second ends of the first and the second hood are releasably and directly connected to each other over the coupling parts, wherein the respective second ends of the first and the second hoods each extend, in an axial direction of the fluid-conducting line, at least up to a separating plane of the coupling, wherein in the separating plane, the first and the second coupling parts are detachable from each other, wherein the covering has an inlet or outlet opening for configuring the cavity to void the condensation of atmosphere which has penetrated into the cavity, wherein, in order to configure the cavity to avoid the condensation of atmosphere which has penetrated into the cavity, media which do not condense at a temperature occurring on a surface in the interior of the covering during operation are introduced into the cavity via the inlet opening, and wherein the covering is composed of an electrically non-conductive material, and is connected to the thermal insulation of the fluid-conducting line via an electrical insulator, and/or an electrical insulator is arranged between the hoods.

2. The coupling arrangement according to claim 1, wherein the first and/or the second coupling part have/has a sealing arrangement which, when the coupling is separated, closes the line connected to the respective coupling part.

3. The coupling arrangement according to claim 1, wherein, in a separated state of the coupling, the first hood of the covering is connected to the fluid-conducting line connected to the first coupling part, and the second hood of the covering is connected to the fluid-conducting line connected to the second coupling part.

4. The coupling arrangement according to claim 3, wherein the first and the second hood of the covering lie against the thermal insulation of the respective fluid-conducting line connected to the coupling arrangement, or are connected thereto, in a gas-tight manner or in a way at least delaying an escape or admission of gas, and in that the first and the second hood of the covering are connectable to each other in a gas-tight manner or in a way at least delaying an escape or admission of gas.

5. The coupling arrangement according to claim 1, wherein at least one of the hoods is provided with a safety valve which limits a pressure difference between the cavity and the surroundings of the covering to a threshold value.

6. The coupling arrangement according to claim 1, wherein the connecting means are configured for separating the coupling parts after manual triggering or when a predetermined force acting axially on the coupling or a bending torque which exceeds a threshold value and acts on the coupling is exceeded.

7. The coupling arrangement according to claim 1, wherein electrical insulating means are provided between the coupling parts and the connecting means or between a coupling part and a fluid-conducting line connected thereto.

8. The coupling arrangement according to claim 1, wherein the covering is configured for thermal insulation between the cavity and the exterior of the covering.

9. A thermally insulated, fluid-conducting line having a coupling arrangement according to claim 1.

10. A loading device for cryogenic fluids, having a coupling arrangement according to claim 1.

11. The loading device for cryogenic fluids, having a thermally insulated, fluid-conducting line according to claim 9.

* * * * *